United States Patent [19]

Nutter

[11] Patent Number: 4,557,876
[45] Date of Patent: Dec. 10, 1985

[54] GAS-LIQUID CONTACT APPARATUS AND METHOD OF MAKING IT

[76] Inventor: Dale E. Nutter, 7935 S. New Haven St., Tulsa, Okla. 74136

[21] Appl. No.: 568,004

[22] Filed: Jan. 4, 1984

[51] Int. Cl.⁴ ............................................. B01F 3/04
[52] U.S. Cl. .............................. 261/94; 29/163.5 R; 261/112; 428/596
[58] Field of Search ................. 261/94, 110, 112, 113, 261/114 R, 114 JP, 114 TC, DIG. 72; 29/163.5 R, 163.5 F, 157 R; 428/596, 597

[56] References Cited

U.S. PATENT DOCUMENTS

| | | | |
|---|---|---|---|
| 2,787,453 | 4/1957 | Hibshman et al. | 261/114 JP |
| 3,079,134 | 2/1963 | Winn | 261/113 |
| 3,343,821 | 9/1967 | Winn et al. | 261/112 |
| 3,372,529 | 3/1968 | Harms | 261/112 X |
| 3,801,419 | 4/1974 | Meek | 261/112 |
| 3,830,684 | 8/1974 | Hamon | 261/112 X |
| 3,969,447 | 7/1976 | Glitsch et al. | 261/112 X |
| 4,052,491 | 10/1977 | Lefevre | 261/112 |
| 4,276,242 | 6/1981 | Chen et al. | 261/111 |
| 4,304,738 | 12/1981 | Nutter | 261/94 |
| 4,339,399 | 7/1982 | Nutter | 261/112 |
| 4,356,611 | 11/1982 | Chen et al. | 29/157 R |

FOREIGN PATENT DOCUMENTS

| | | | |
|---|---|---|---|
| 171258 | 5/1952 | Austria | 261/112 |
| 636481 | 2/1962 | Canada . | |
| 698572 | 11/1964 | Canada . | |
| 736646 | 6/1966 | Canada . | |

Primary Examiner—Richard L. Chiesa
Attorney, Agent, or Firm—Beveridge, DeGrandi and Weilacher

[57] ABSTRACT

A gas-liquid contact grid is formed of grid members which are connected together by connector members. Each grid member has an elongated upstanding web and laterally extending upper and lower flanges which are discontinuously formed of flange segments which extend alternately in opposite lateral directions from the web. Openings are provided in the upper and lower flanges. The web has interruptions which are located below and in vertical alignment with the ends of the flange segments to cause downwardly flowing liquid to spread longitudinally along the web. The flange segments on adjacent grid members do not extend toward each other to constrict the flow of ascending gases.

The connector members are slotted and they extend through aligned holes in the webs of the grid members. During assembly, a connector member is inserted through the holes, and then it is rotated so that the slots engage the web to retain the connector members and the grid members in interengaged relationship.

23 Claims, 8 Drawing Figures

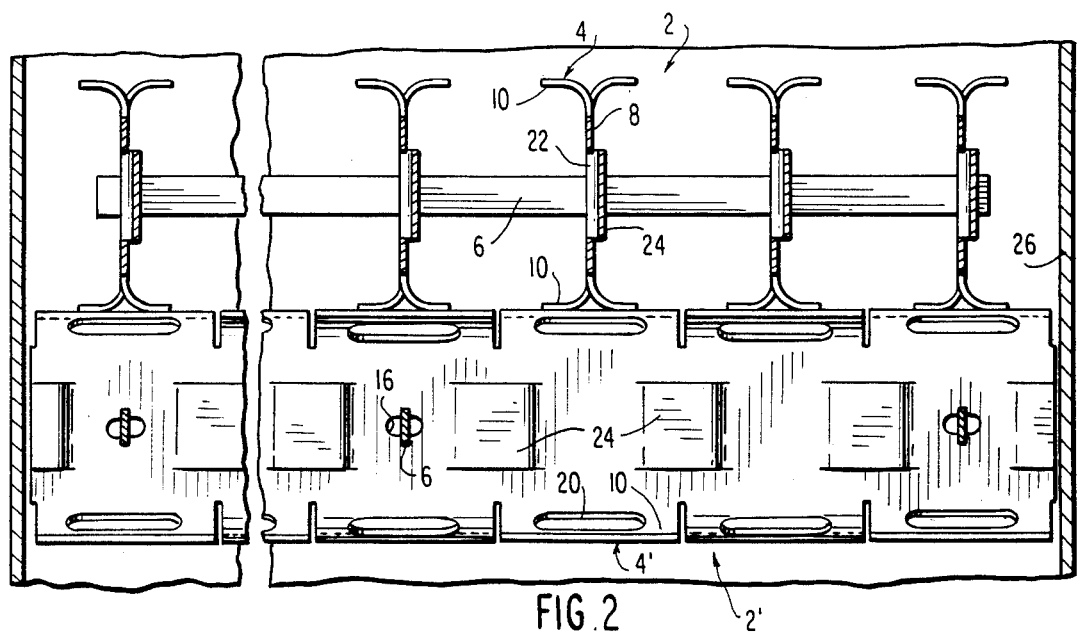
FIG.2
FIG.3
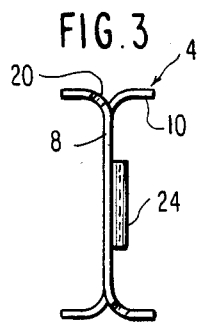
FIG.4
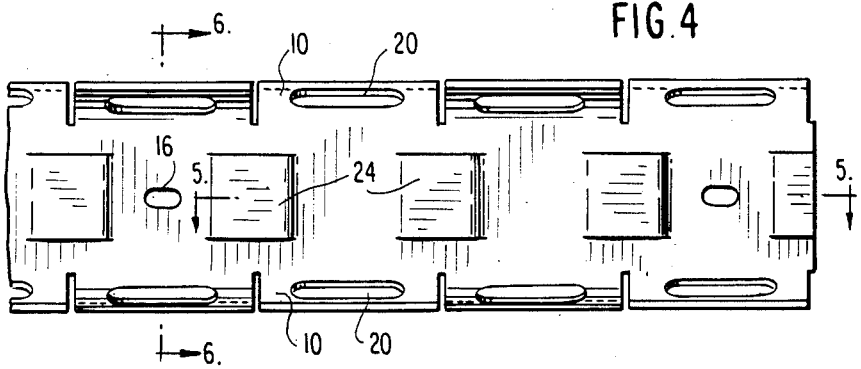
FIG.6
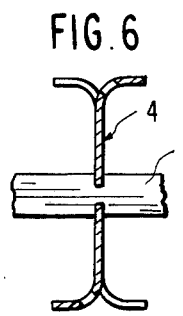
FIG.5
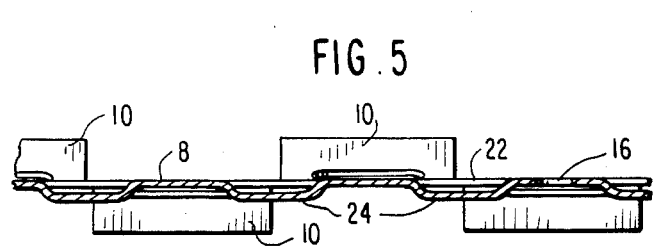
FIG.7
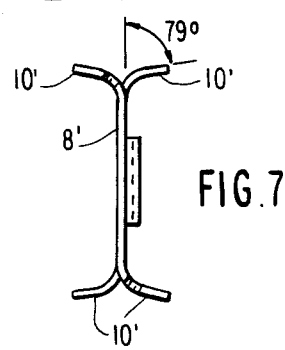
FIG.8
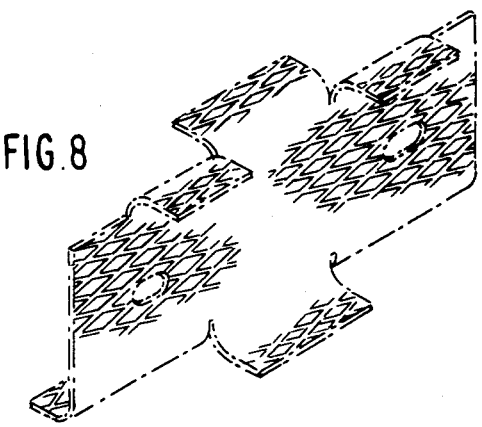

4,557,876

GAS-LIQUID CONTACT APPARATUS AND METHOD OF MAKING IT

BACKGROUND OF THE INVENTION

This invention relates to improved gas-liquid contact apparatus for fractionation towers or other vessels which have beds of packing formed of stacked grids.

Packing materials are used in chemical processing apparatus to provide passage for upwardly flowing gases and to provide supporting surfaces for downwardly flowing liquid. Liquid introduced to the upper end of the packing flows downwardly as a thin film on the surfaces of the packing material. Gaseous vapors are injected into the lower end of the vessel and ascend through the openings in the packing material, moving through the vessel in intimate contact with the liquid film on the surfaces of the packing. Such contact between the liquid and gas can produce mass transfer, a chemical reaction, heat exchange and/or scrubbing of the gaseous stream.

The invention described in this specification is primarily envisioned for use in pump-around sections and flash sections of vacuum fractionating towers where direct contact between the vapor and the liquid is used to remove heat from the ascending vapor. In flash sections, there is a low liquid flow rate in relation to the gas flow rate. Ideally, there is a minimal amount of entrainment of liquid droplets into the gaseous stream, a minimal pressure differential between the incoming gases and the outgoing gases, and a continuous downward flow of liquid which assures that effective heat exchange will continue throughout a wide range of gas flow rates.

Many fractionating towers are equipped with grids, known in the art as Glitsch Grid, which are similar to the grids shown in FIGS. 1 and 18 of Winn et al., U.S. Pat. No. 3,343,821. Grids constructed according to the present invention are believed to provide a lower pressure drop and a similar efficiency to the Glitsch Grid. Furthermore, the improved grids are less complicated and less expensive to manufacture and install than the Glitsch Grid. The grids disclosed in this specification can be made of larger and fewer parts, and they can be assembled with little or no welding. They are also more rigid which reduces the need for supporting truss structures and simplifies the task of removing the grids from towers in situations where replacement is required.

The principal objective of the present invention is to provide a packing with low pressure drop, reasonable efficiency and minimal entrainment at high gas flow rates. Additional objectives are to provide a packing which is relatively uncomplicated, easily manufactured and structurally sound.

With regard to its physical configuration, the present invention involves several improvements to the type of grid illustrated in FIGS. 5 and 12 of the Winn et al. U.S. Pat. No. 3,343,821. As will be described in greater detail below, these improvements pertain to the manner in which the flanged grid members are connected together, the presence of openings in the flanges of the grid members, a modified orientation of the flange segments to reduce the constriction to the flow of ascending gas, and the provision of interruption means which are located in the webs below the ends of the flange segments in order to provide longitudinal distribution of the liquid on the webs. The invention also relates to an improved method of manufacturing the grid to reduce fabrication and assembly costs.

SUMMARY OF THE INVENTION

This invention relates to gas-liquid contact apparatus wherein a grid is formed of a plurality of spaced apart grid members which are connected together by a plurality of connector members. The surfaces of the grid are wettable by liquid flowing downwardly thereon, and there are a plurality of vertical passages which permit ascending gases to flow through the grid. More particularly, this invention relates to improvements in a known grid of this type wherein each grid member comprises an elongated upstanding web, and upper and lower flanges which extend laterally from the upper and lower portions of the web. Each of these flanges is discontinuously formed of a plurality of flange segments which extend alternately in opposite lateral directions from the web.

One improvement provided by the present invention is that the flanges have openings formed therein. The openings in the upper flanges permit liquid to flow through the upper flanges and onto the web, and the openings in the lower flanges permit gas to flow through the lower flanges into contact with the liquid on the web. Preferably, the flange openings are longitudinally elongated. The laterally extending flanges lie at an angle which is oriented at about 90° to 135° relative to the web. The flanges are connected to the webs by radiussed bends having inner radii which are at least twice the web thickness. This enables the liquid to flow over the bends without collecting in stagnant pockets.

Another improvement according to the invention is that each of the flange segments and the flange segments spaced transversely therefrom on the other grid members comprise a set of flange segments which extend in a same direction from their respective webs. With this arrangement, the flange segments of adjacent grid members do not extend toward each other to constrict the flow of ascending gases.

Another aspect of the invention is that the webs have interruption means which cause liquid to spread longitudinally along the webs. These interruption means are located at positions below and in vertical alignment with the ends of the flange segments in order to cause longitudinal spreading of the liquid which flows downwardly from the ends of the flange segments. Preferably, each interruption means is an opening formed in the web. The webs have upset portions which are laterally displaced from the webs and are in register with the openings. These upset portions are capable of supporting a film of liquid which is exposed to gases ascending through the grid.

Another feature of the invention relates to the manner in which the connector members are joined to the grid members. The connector members extend through holes in the webs of the grid members. Slots are formed in the connector members at spacings which correspond to the distances between the grid members. Each connector member has a size and shape which is capable of being inserted through the holes when the connector member is disposed at a first orientation during assembly of the grid. In the assembled grid, the connector members are at a second orientation which is rotationally displaced from the first orientation. When in the second orientation, i.e. the final assembled orientation, the connector members have their slots engaged with portions of the web to retain the connector members and the grid members in interengaged relationship.

The invention also contemplates the formation of the grid members out of expanded metal which is either in an as-expanded state or has been subjected to a mechanical flattening process subsequent to expansion.

Preferably, a bed is formed of a plurality of the grids which are stacked on each other at a disposition where the grid members of one grid are, in horizontal planes, angularly turned relative to the grid members of an adjacent grid.

The invention also involves a method of manufacturing a gas-liquid contact grid, this method being performed by inserting slotted connector members through holes in the grid members to a position where the slots in the connector members are located in the planes of the grid members. The connector members are then turned about their axes to move the slots into engagement with the grid members so that portions of the grid members are received in the slots in order to hold the grid members together in spaced relationship. Preferably, the slot are formed in opposite edges of the connector members so that two opposed slots engage a grid member adjacent to each hole.

The invention may take many forms, illustrative embodiments of which are described in the following text and illustrated in the accompanying drawings.

BRIEF DESCRIPTION OF THE DRAWINGS

FIG. 2 is a vertical sectional view through a tower which has two layers of grids constructed according to the invention.

FIG. 3 is an end view of one of the grid members.

FIG. 4 is a side view of one of the grid members.

FIG. 5 is a sectional view taken along the lines 5—5 in FIG. 4.

FIG. 6 is a sectional view taken along the lines 6—6 in FIG. 4, also showing a connector bar which passes through and is connected to the grid member.

FIG. 7 is a view similar to FIG. 3 showing a modified grid member in which the flanges are oriented at an obtuse angle relative to the web of the grid member.

FIG. 8 is a perspective view of a modified grid member which is formed of expanded metal.

BRIEF DESCRIPTION OF A PREFERRED EMBODIMENT

Figure 1:
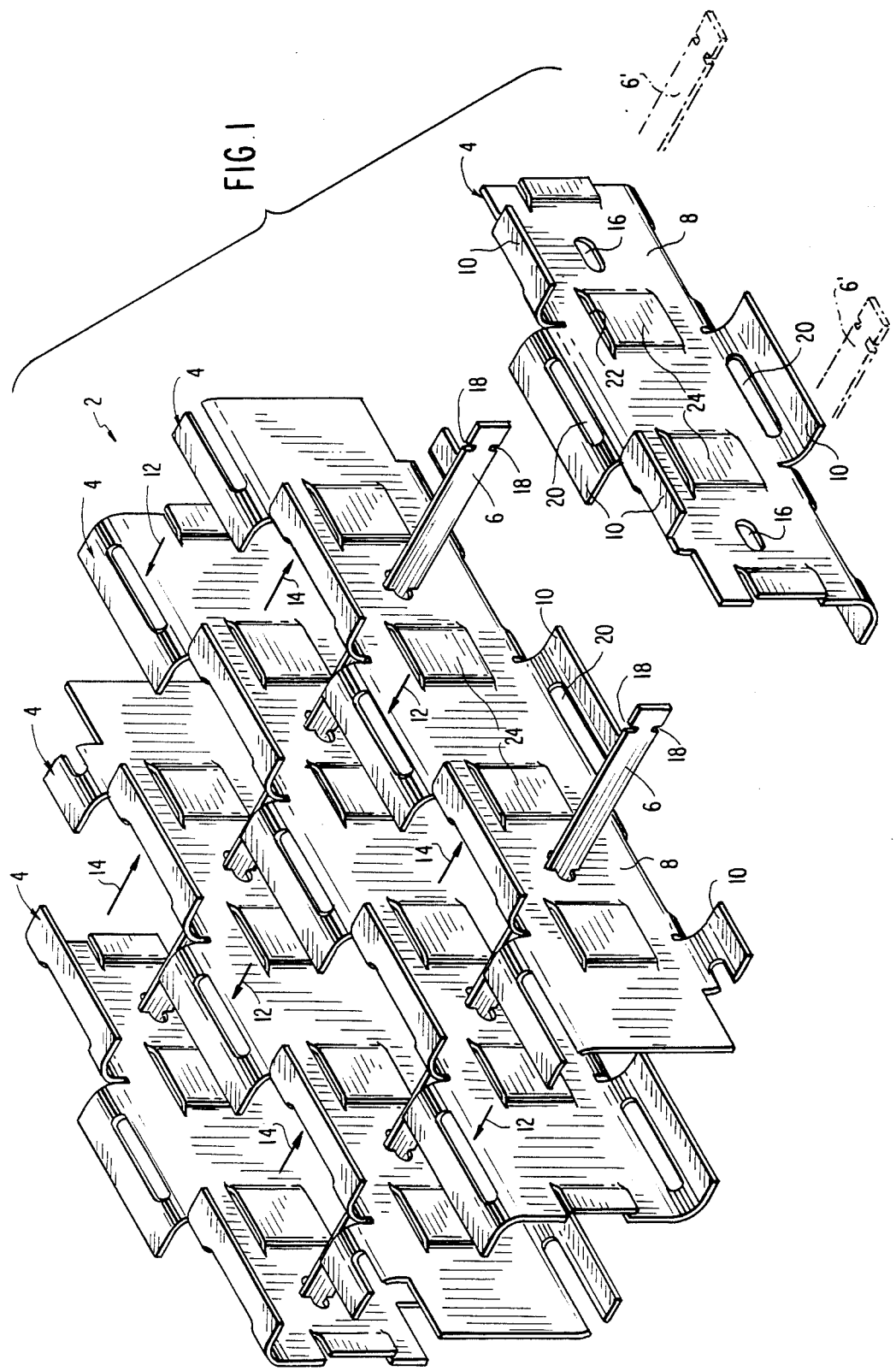
FIG. 1 is a partially exploded perspective view showing a gas-liquid contact grid constructed according to the invention.

Referring to FIG. 1, it will be seen that the grid 2 is formed of a plurality of grid members 4 which are connected together by a plurality of connector members 6. When in use, a bed formed of a stack of such grids is positioned in a tower or other vessel. Liquid is introduced at the upper end of the vessel above the bed, and gas is introduced below the bed. The surfaces of the grid are wetted by the liquid which flows downwardly thereon. The spaces between the grid members 4 and the connector members 6 provide vertical passages, best seen in FIG. 2, which permit the flow of ascending gases through the contact grid.

Each of the grid members 4 has an elongated upstanding web 8 and flanges which extend laterally from the upper and lower portions of the web. These flanges are discontinuously formed of a plurality of flange segments 10 which extend alternately in opposite lateral directions from the web 8. The flange segments are connected to the web by radiused bends, the inner radii of which are at least twice the thickness of the web material.

The flange segments 10 are arranged in sets throughout the grid so that each flange segment and the flange segments which are spaced transversely therefrom on the other grid members comprise a set of flange segments which extend in a same direction from their respective webs 8. Due to this disposition, the flange segments on adjacent grid members do not extend toward each other to constrict the flow of ascending gases. The grid shown in FIG. 1 has leftwardly oriented central and outer sets of upper flange segments 10 aligned with the arrows 12, and the two rightwardly directed sets of upper flange segments aligned with the arrows 14. In each set, the flange segments provide a parallel flow which is believed to contribute to the efficacy of the apparatus.

An important feature of the invention is the manner in which the grid members 4 are connected together by the connector bars 6. The grid members 4 have holes 16 for receiving the connector bars 6. Each of these connector bars 6 is provided with slots 18 in its opposite edges at spacings which correspond to the spacings between the grid members 4. The connector bars have sizes and shapes which permit them to be inserted, during assembly, through an aligned set of holes 16 in the grid members. This insertion is performed when the faces of the connector bars are horizontal as shown at 6' in broken lines in FIG. 1. The holes 16 are horizontally elongated to permit such insertion. When the connector bars 6 are turned to the assembled orientation shown in solid lines in FIG. 1, their faces are vertical and their slots 18 are engaged with portions of the webs to retain the connector bars and grid members in interengaged relationship. This relationship is also shown in FIG. 6.

The flange segments preferably are provided with longitudinally elongated openings 20. These openings 20 promote the longitudinal distribution of liquid on the flange surfaces, and they also permit liquid and gases to flow through the flange segments 10. Liquid which impinges and coalesces on the upper flange segments flows around the ends of the openings 20 to one side of the web, and the liquid also flows downwardly through the openings 20 to the opposite side of the web 8. Ascending gases are able to flow upwardly through the openings 20 in the lower flange segments in order to come into contact with liquid on web 8. In the absence of such openings, it would be necessary to provide narrower flange segments to obtain an equivalent amount of gas flow over the web.

In order to prevent streams of liquid from flowing downwardly on the web from the ends of the flange segments 10, the grid 2 is provided with interruption means which are located below and in vertical alignment with the ends of the flange segments. In the illustrated embodiment, these interruption means are openings 22, shown in FIGS. 2 and 5, formed by upsetting portions of the webs. Due to the presence of the openings 22, liquid which flows downwardly from the ends of the flange segments 10 will spread longitudinally along the web 8 so that a larger area of the web will be wetted by the liquid for exposure to the ascending gas.

The web openings 22 are bridged by the rectangular upset portions 24 which are laterally spaced from and in register with the web openings 22. The upset portions 24 provide a liquid-supporting surface and a target for entrained droplets.

Grids constructed according to the invention are normally stacked one upon the other to form beds which are supported by horizontal beams in the vessel. These beds may be from four to six feet deep in a tower having a twenty foot diameter. A suitable grid height is about three inches so that a bed four feet deep will require a stack of about sixteen grids or layers. FIG. 2 shows a vessel 26 with only two layers by way of example. The grid members 4 in one layer 2 are, in horizontal planes, angularly turned 90° relative to the grid members 4' of the adjacent grid 2'. An angle of 45° is preferred, but it is expected that the apparatus will operate satisfactorily if this angular relationship between adjacent grids is from about 30° to 90°.

In the embodiments illustrated in FIGS. 1–6, the flange segments 10 are perpendicular to the webs 8. A modified grid member is shown in FIG. 7 in which the flange segments 10' are oriented at an obtuse angle of approximately 101° relative to the web 8'. It is envisioned that this obtuse angle may be as great as 135°. Throughout this angular range, it is considered that the flange segments extend laterally from their respective webs. As the angle increases, there is extra height, a greater baffling effect and potentially a lower pressure drop through the apparatus.

The members 4 and 6 shown in FIGS. 1–7 are preferably formed of sheet material having a thickness of 16 gauge and 12 gauge respectively. However, in the embodiment illustrated in FIG. 8, the grid members are formed of expanded metal, i.e. metal which is formed of a flat sheet which is slited and then deformed so that each slit becomes a diamond-shaped aperture. The bands of material between the diamond-shaped apertures may be inclined relative to the general plane of the sheet as shown in U.S. Pat. No. 4,304,738, or the expanded metal sheet may be passed through a roll to flatten it so that the bands of material are substantially coplanar with the general plane of the sheet. In either case, the diamond-shaped apertures provide the flange openings and the web interruptions.

The fabrication of a single grid is relatively uncomplicated in comparison to the fabrication of the grids of existing contact apparatus. This is due to the relative simplicity of the components and, more importantly, to the fact that there is no need to weld the connector members 6 at every intersection with a grid member 4. In assembling a single grid 2, the connector members 6 are inserted through the aligned holes 16 to positions where the slots 18 in the connector members are located in the planes of the grid members. This insertion is performed when the faces of the connector members are horizontal as shown in broken lines at 6' in FIG. 1. When a connector member reaches a position where its slots 18 are located in the planes of the grid members 4, the connector member 6 is twisted to turn it about its longitudinal axis, thereby moving the slots 18 in the opposite edges of the connector member into locking engagement with the grid members 4. The slots 18 on the opposite edges of the connector member 6 engage portions of the webs 8 which are located on opposite sides of the holes. This holds the grid members together in spaced relationship. If desired, a single weld or other attachment means may be applied to each connector member 6 to prevent subsequent rotation of the connector member to a disengaged position.

In addition to the convenience of assembling the grid, it has been found that the disclosed interconnections are convenient when installing a grid in a tower, particularly when there are internal protrusions such as burrs or bolts which tend to interfere with the placement of the grid. With the grid disclosed in this specification, the elements may be shifted slightly to avoid such interference.

When a bed of grids 2 is installed in a tower, liquid is introduced in the upper region of the tower by spray devices, drip troughs or other devices which are well known in the art. The grids in the bed are preferably arranged so that the falling liquid droplets will strike at least one of the grid members. Droplets will normally strike the upper flange segments 10 where they will coalesce with other droplets to form a film which tends to flow from the flange 10 toward the web 8. Droplets which strike the flanges at locations which are located outboard of the openings 20 will tend to flow longitudinally before they move toward the web. On each flange segment, some of the liquid may flow around the convex portion of the bend onto one side of the web, and another part of the liquid may flow through the opening onto the opposite side of the web. The radiused bends enable liquid to flow from the lower surfaces of the flanges to the webs without collecting in stagnant pockets.

Flow concentrations may occur in the areas which are vertically aligned with the ends of the flange segments, but this flow will tend to be diverted in longitudinal directions due to the openings 22 or other interruption means in the web. Continuing downward movement of the liquid will carry it to the lower flange segments and some of the liquid may flow on the lower side of the flange segments. There is a tendency for the liquid to be released from the lower flange at an area where it is in physical contact with the upper flange of the next lower layer.

Throughout its downward movement, the liquid is exposed to the ascending gases. Small droplets of liquid may become entrained in the ascending gases. The grid provides a target for these entrained droplets so that, when they strike a surface of the grid, they will coalesce to become part of the body of downflowing liquid on the packing.

The ascending gases will be particularly turbulent in the areas where they are moving from one grid to the next grid. This turbulence is produced by the coaction of the flange segments 10 in these areas. Some gas flows through the lower flange openings 20 into contact with the liquid on the webs 8. Since the flange segments 10 are arranged in sets which extend in a same direction from their respective webs, the gas passages through the grids are not unduly constricted inasmuch as the gases are not required to pass between two flange segments 10 which are turned toward each other in opposite directions.

It is emphasized that the invention may take many forms other than the preferred embodiments described in this specification. For example, a grid may have only one or two of the inventive features described above. When any particular feature is utilized, it is preferred but not essential that it be applied to all members in the grid. Other modifications will be evident to persons skilled in the art. For example, the flange openings 20 may be circular rather than elongated. The upper edges of the web openings 22 may be arched to encourage longitudinal flow of liquid on the web. The upset portions may, if desired, extend alternately in opposite directions so that the upset portions on a grid member will lie both to the left and to the right of the web. The upset portions 24 may be removed from the web; and, in some instances, the openings 22 may be replaced by another type of interruption means such as a rib formed in the web 8.

In view of the many forms which the invention may take, it is emphasized that the invention is not limited to the embodiments disclosed in this specification but is embracing of many different structures and methods which fall within the spirit of the following claims.

I claim:

1. Gas-liquid contact apparatus, comprising, a grid formed of a plurality of spaced apart grid members which are connected together by a plurality of connector members, said grid having surfaces which are wettable by liquid flowing downwardly thereon and having a plurality of vertical passages which permit the flow of ascending gases through the grid,
   each of said grid members comprising an elongated upstanding web having upper and lower flanges which extend laterally from the upper and lower portions of the web,
   each of said upper flanges being discontinuously formed of a plurality of flange segments which extend alternately in opposite lateral directions from the web,
   each of said lower flanges being discontinuously formed of a plurality of flange segments which extend alternately in opposite lateral directions from the web,
   each of said flange segments and the flange segments spaced transversely therefrom on the other said grid members extending in a same direction from their respective webs so that said flange segments on adjacent grid members do not extend toward each other to constrict the flow of ascending gases,
   said upper flanges having openings which permit liquid to flow through the upper flanges and onto the web, said lower flanges having openings which permit gas to flow through the lower flanges into contact with the liquid on said web.

2. A gas-liquid contact apparatus according to claim 1 wherein the openings in said flanges are longitudinally elongated.

3. A gas-liquid contact apparatus according to claim 1 wherein the webs are formed of material which has a given thickness, said grid members having radiused bends connecting the flanges to the webs, said bends having inner radii which are at least twice the thickness of their respective webs so that liquid is able to flow over said bends without collecting in stagnant pockets.

4. A gas-liquid contact apparatus according to claim 1 wherein said grid members are formed of expanded metal.

5. A gas-liquid contact apparatus according to claim 1 wherein a plurality of said grids are stacked on each other.

6. A gas-liquid contact apparatus according to claim 5 wherein the grid members of one of said grid are, in horizontal planes, angularly turned relative to the grid members of an adjacent grid.

7. A gas-liquid contact apparatus according to claim 1 having interruption means located below and in vertical alignment with the ends of the flange segments, said interruption means being operable to cause liquid which flows downwardly from the ends of the flange segments to spread longitudinally along said webs.

8. A gas-liquid contact apparatus according to claim 7, wherein the interruption means are openings in the webs, said webs having upset portions which are laterally displaced from the webs and are in register with said openings, said upset portions being operable to support a film of liquid which is exposed to gases ascending through the grid.

9. Gas-liquid contact apparatus, comprising, a grid formed of a plurality of spaced apart grid members which are connected together by a plurality of connector members, said grid having surfaces which are wettable by liquid flowing downwardly thereon and having a plurality of vertical passages which permit the flow of ascending gases through the grid,
   each of said grid members comprising an elongated upstanding web having upper and lower flanges which extend laterally from the upper and lower portions of the web,
   each of said upper flanges being discontinuously formed of a plurality of flange segments which extend alternately in opposite lateral directions from the web,
   each of said lower flanges being discontinuously formed of a plurality of flange segments which extend alternately in opposite lateral directions from the web,
   said webs having holes which receive said connector members, said connector members extending through said holes and engaging the webs to hold said grid members together in spaced relationship.
   each of said connector members having slots formed therein at spacings which correspond to the distances between said grid members,
   each said connector member having a size and shape which is capable of being inserted through said holes when the connector member is disposed at a first orientation during assembly of the grid, said connector members in the assembled grid being at a second orientation which is rotationally displaced from said first orientation, said connector members when in said second orientation having their slots engaged with portions of said web to retain the connector members and grid members in interengaged relationship, each of said holes being located at a position which, in a direction extending lengthwise of its respective grid member, is between the opposite ends of one of said flange segments, each of said connector members having portions which lie in vertical alignment with one of the flange segments.

10. A gas-liquid contact apparatus according to claim 1, said upper flanges having openings which permit liquid to flow through the upper flanges and onto the web, said lower flanges having openings which permit gas to flow through the lower flanges into contact with the liquid on said web.

11. A gas-liquid contact apparatus according to claim 9 wherein the webs are formed of material which has a given thickness, said grid members having radiused bends connecting the flanges to the webs, said bends having inner radii which are at least twice the thickness of their respective webs so that liquid is able to flow over said bends without collecting in stagnant pockets.

12. A gas-liquid contact apparatus according to claim 9, wherein said grid members are formed of expanded metal.

13. A gas-liquid contact apparatus according to claim 9, wherein a plurality of said grids are stacked on each other.

14. A gas-liquid contact apparatus according to claim 13, wherein the grid members of one said grid are, in horizontal planes, angularly turned relative to the grid members of an adjacent grid.

15. A gas-liquid contact apparatus according to claim 9, said webs having interruption means located below and in vertical alignment with the ends of the flange segments, said interruption means being operable to cause liquid which flows downwardly from the ends of the flange segments to spread longitudinally along said webs.

16. A gas-liquid contact apparatus according to claim 15, wherein the interruption means are openings in the webs, said webs having upset portions which are laterally displaced from the webs and are in register with said openings, said upset portions being operable to support a film or liquid which is exposed to gases ascending through the grid.

17. A gas-liquid contact apparatus according to claim 15, each of said flange segments and the flange segments spaced transversely therefrom on the other said grid members extending in a same direction from their respective webs so that said flange segments on adjacent grid members do not extend toward each other to constrict the flow of ascending gases.

18. A gas-liquid contact apparatus according to claim 15, said upper flanges having openings which permit liquid to flow through the upper flanges and onto the web, said lower flanges having openings which permit gas to flow through the lower flanges into contact with the liquid on said web.

19. A gas-liquid contact apparatus according to claim 9, each of said flange segments and the flange segments spaced transversely therefrom on the other said grid members extending in a same direction from their respective webs so that said flange segments on adjacent grid members do not extend toward each other to constrict the flow of ascending gases.

20. A gas-liquid contact apparatus according to claim 19 said upper flanges having openings which permit liquid to flow through the upper flanges and onto the web, said lower flanges having openings which permit gas to flow through the lower flanges into contact with the liquid on said web.

21. Gas-liquid contact apparatus, comprising, a grid formed of a plurality of spaced apart grid members which are connected together by a plurality of connector members, said grid having surfaces which are wettable by liquid flowing downwardly thereon and having a plurality of vertical passages which permit the flow of ascending gases through the grid, each of said grid members comprising an elongated upstanding web having upper and lower flanges which extend laterally from the upper and lower portions of the web, each of said upper flanges being discontinuously formed of a plurality of flange segments which extend alternately in opposite lateral directions from the web, each of said lower flanges being discontinuously formed of a plurality of flange segments which extend alternately in opposite lateral directions from the web, said upper flanges having openings which permit liquid to flow through the upper flanges and onto the web, said lower flanges having openings which permit gas to flow through the lower flanges into contact with the liquid on said web, each of said flange segments and the flange segments spaced transversely therefrom on the other said grid members extending in a same direction from their respective webs so that said flange segments on adjacent grid members do not extend toward each other to constrict the flow of ascending gases, said webs having interruption means located below and in vertical alignment with the ends of the flange segments, said interruption means being operable to cause liquid which flows downwardly from the ends of the flange segments to spread longitudinally along said webs, said webs having holes which receive said connector members, said connector members extending through said holes and engaging the webs to hold said grid members together in spaced relationship, each of said connector members having slots formed therein at spacings which correspond to the distances between said grid members, each said connector member having a size and shape which is capable of being inserted through said holes when the connector member is disposed at a first orientation during assembly of the grid, said connector members in the assembled grid being at a second orientation which is rotationally displaced from said first orientation, said connector members when in said second orientation having their slots engaged with portions of said web to retain the connector members and grid members in interengaged relationship.

22. A method of making a gas-liquid contact grid from a plurality of grid members and a plurality of connector members, said grid members having a plurality of flange segments which are discontinuously formed and extend alternately in opposite lateral directions from upper and lower portions of the web, said grid members having holes therein for receiving said connector members, each of said holes being located at a position which, in a direction extending lengthwise of its respective grid member, is between the opposite ends of one of said flange segments, said connector members having slots therein, said method being performed by inserting the connector members through said holes to a position where the slots in the connector members are located in the planes of said grid members and portions of the connector members lie in vertical alignment with said flange segments, turning said connector members about their axes to move said connector member slots into engagement with said grid members so that portions of said grid members are received in said slots to hold the grid members together in spaced relationship.

23. A method according to claim 22 wherein each of said connector members has opposite edges, said slots being formed in said opposite edges, said turning step being performed to move the slots on opposite edges of said connector members into engagement with portions of said grid member which are located on opposite sides of said holes, whereby two said slots engage a grid member adjacent to each said hole.

* * * * *